(12) United States Patent
Reinhard et al.

(10) Patent No.: US 12,734,627 B2
(45) Date of Patent: Sep. 15, 2026

(54) SPINDLE FOR A MACHINE TOOL

(71) Applicant: GF Machining Solutions AG, Biel (CH)

(72) Inventors: Edwin Reinhard, Niederoenz (CH); Adrian Wittwer, Schafisheim (CH); Jérémie Monnin, Des Plaines, IL (US); Juergen Reichenbaecher, Busswil (CH)

(73) Assignee: GF MACHINING SOLUTIONS AG, Biel (CH)

( * ) Notice: Subject to any disclaimer, the term of this patent is extended or adjusted under 35 U.S.C. 154(b) by 183 days.

(21) Appl. No.: 18/910,275

(22) Filed: Oct. 9, 2024

(65) Prior Publication Data

US 2025/0121467 A1 Apr. 17, 2025

(30) Foreign Application Priority Data

Oct. 12, 2023 (EP) .................................... 23203203

(51) Int. Cl.
*B23Q 5/20* (2006.01)
*B23Q 1/70* (2006.01)
(Continued)

(52) U.S. Cl.
CPC ................ *B23Q 5/20* (2013.01); *B23Q 1/70* (2013.01); *B23Q 5/10* (2013.01); *B23Q 17/007* (2013.01);
(Continued)

(58) Field of Classification Search
CPC ... B23Q 5/20; B23Q 1/70; B23Q 5/10; B23Q 17/007; B23Q 17/0952; B23Q 17/0971;
(Continued)

(56) References Cited

U.S. PATENT DOCUMENTS

2004/0179915 A1* 9/2004 Hill ...................... G05B 19/406 409/141
2005/0160847 A1* 7/2005 Walter .................. B23Q 17/10 74/89.37

(Continued)

FOREIGN PATENT DOCUMENTS

EP 4147819 A1 3/2023

OTHER PUBLICATIONS

Freescale Semiconductor, “Sensors Acceleration Sensors”, Dec. 31, 2010, XP055632819, Document No. MMASERIESFS REV 13, Retrieved from the Internet: URL:https://www.nxp.com/docs/en/fact-sheet/MMASERIESFS.pdf, NXP, Netherlands.

*Primary Examiner* — Ryan J. Walters
(74) *Attorney, Agent, or Firm* — LEYDIG, VOIT & MAYER, LTD.

(57) ABSTRACT

A spindle for a machine tool for machining a metal workpiece, including a motor including a stator and a rotor arranged in a spindle housing, a spindle shaft operationally connected to the motor, a clamping interface for clamping a machining tool, a vibration sensing unit for detecting vibration of the spindle arranged in the spindle housing, and a crash sensing unit configured to detect that a crash event occurred on the spindle. The spindle further includes a tool-position monitoring unit for detecting a position of the clamping interface, a motor temperature sensor arranged closely to the motor on the stator and configured to generate a motor temperature signal, a bearing temperature sensor for measuring a temperature of a bearing arranged on the bearing for supporting the spindle shaft configured to generate a bearing temperature signal, and a spindle diagnosis module arranged in the spindle housing.

15 Claims, 2 Drawing Sheets

(51) Int. Cl.

| | |
|---|---|
| ***B23Q 5/10*** | (2006.01) |
| ***B23Q 17/00*** | (2006.01) |
| ***B23Q 17/09*** | (2006.01) |
| ***B23Q 17/12*** | (2006.01) |
| ***B23Q 17/22*** | (2006.01) |

(52) U.S. Cl.
CPC ..... *B23Q 17/0952* (2013.01); *B23Q 17/0971* (2013.01); *B23Q 17/0985* (2013.01); *B23Q 17/12* (2013.01); *B23Q 17/2208* (2013.01)

(58) Field of Classification Search
CPC . B23Q 17/0985; B23Q 17/12; B23Q 17/2208
See application file for complete search history.

(56) References Cited

U.S. PATENT DOCUMENTS

2006/0085092 A1* 4/2006 Redecker ............. B23Q 17/098 700/174
2008/0080943 A1* 4/2008 Bernhard ............. B23B 31/261 409/233
2009/0267429 A1* 10/2009 Moller ..................... B23Q 5/04 409/231
2015/0352679 A1* 12/2015 Yamamoto ............ B23Q 17/00 73/865.8

* cited by examiner

SPINDLE FOR A MACHINE TOOL

CROSS REFERENCE TO RELATED APPLICATIONS

This application claims benefit to European Patent Application No. 23203203.7, filed on Oct. 12, 2023, which is hereby incorporated by reference herein.

FIELD

The present invention is related to a spindle for a machine tool.

BACKGROUND

The spindle is one of the most essential components of a machine tool. The quality of the produced parts depends to a high degree on the functionality of the spindle. Especially, the high-speed spindles have been widely used in the machine tools. In the recent years, the requirements for the machine and the main spindle related to the productivity, lifetime and reliability has greatly increased. A malfunction of such spindles can cause machining interruption which can directly reduce the productivity and finally cause a financial damage. Thus, a highly reliable spindle provides a key competitive advantage to the machining manufactures and the end-user.

Monitoring the spindle state is one measure to prevent dangerous situations for both the process and final parts as well as the machine, to improve the quality of the output, to predict the remaining lifetime of the equipment and to initiate necessary maintenance activities on time. Additionally, the spindle manufacturer can also access to operational conditions of the spindle or machine tool and further improve its products and services.

US 2009/0267429 discloses a spindle for a machine tool. The spindle has a housing for accommodating an electric motor and a shaft which can be driven by the latter. At least one data acquisition element for recording operating and/or state data of the spindle is provided. The data acquisition element is in the form of a radio chip and can be read by radio using a read element.

However, the data analysis capabilities of the monitoring device in the prior art are still to be improved.

SUMMARY

In an embodiment, the present disclosure provides A spindle for a machine tool for machining a metal workpiece, comprising a motor including a stator and a rotor arranged in a spindle housing, a spindle shaft operationally connected to the motor, the rotor being mounted on an outer surface of the spindle shaft, wherein the motor is configured to drive the spindle shaft for rotation, and a clamping interface for clamping a machining tool, wherein the clamping interface is arranged at one end of the spindle shaft. The spindle further comprises a vibration sensing unit for detecting vibration of the spindle arranged in the spindle housing including three vibration sensors for sensing acceleration of the spindle in three linear axes and a vibration sensor circuit configured to process a sensed signal resulting in a vibration signal by amplification, analog-to-digital conversion and filtering. The spindle further comprises a crash sensing unit configured to detect that a crash event occurred on the spindle arranged in the spindle housing including three crash sensors for sensing the acceleration of the spindle in three linear axes and a crash sensor circuit configured to process a sensed signal resulting in a crash signal by amplification, analog-to-digital conversion and filtering. The spindle further comprises a tool-position monitoring unit for detecting a position of the clamping interface configured to generate a tool position signal, wherein the tool position signal is a digital signal, a motor temperature sensor for measuring a temperature of the motor arranged closely to the motor on the stator and configured to generate a motor temperature signal, and a bearing temperature sensor for measuring a temperature of a bearing arranged on the bearing for supporting the spindle shaft configured to generate a bearing temperature signal. The spindle further comprises a spindle diagnosis module arranged in the spindle housing including a first communication interface configured to communicate with the vibration sensing unit and the crash sensing unit, a second communication interface configured to communicate with the tool-position monitoring unit, a third communication interface configured to communicate with the bearing temperature sensor, a fourth communication interface configured to communicate with external devices arranged outside of the spindle, a processing unit configured to process received sensor signals, and a data storage unit configured to store the received sensor signals.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
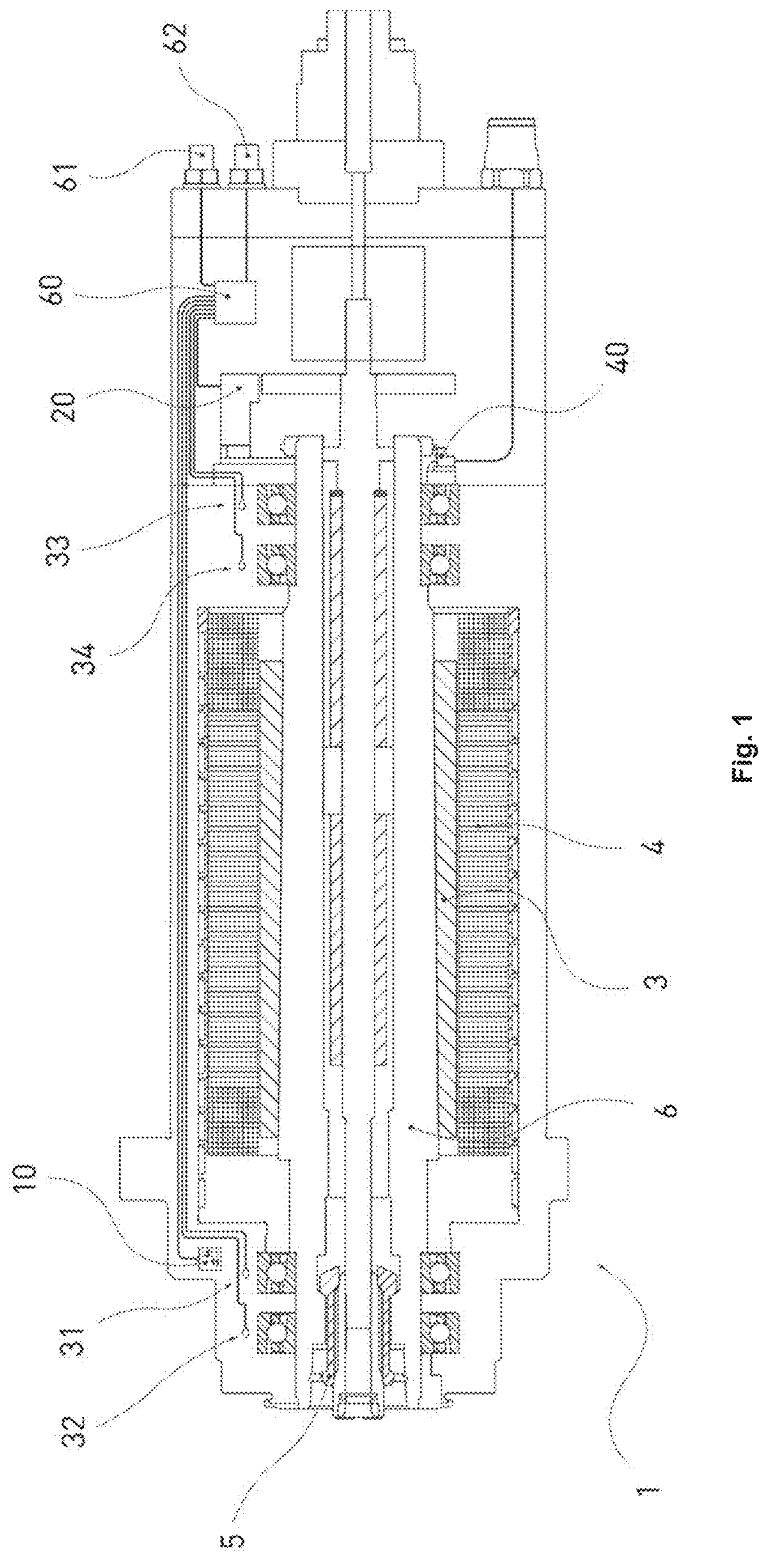
FIG. 1 illustrates a simplified sectional view of a spindle for a machine tool.

In an embodiment, the present disclosure provides a spindle for a machine tool having an improved operating state monitoring functionality. In particular, enhanced data processing possibilities are provided.

The present disclosure is related to a spindle for a machine tool, in particular for machining a metal workpiece. Preferably, the spindle is a high-speed spindle applied for machining metal workpieces. The spindle comprises a motor including a stator and a rotor arranged in a spindle housing, a clamping interface for clamping a machining tool, and a spindle shaft. The spindle shaft is operationally connected to the motor, in particular the rotor is mounted on the outer surface of the spindle shaft. During operation of the spindle the motor drives the spindle shaft for rotation. The clamping interface is mounted at one end of the spindle shaft.

The spindle further comprises a vibration sensing unit for detecting the vibration of the spindle, a crash sensing unit for detecting the crash event occurred on the spindle, a tool-position monitoring unit, a motor temperature sensor, a bearing temperature sensor and a spindle diagnosis module.

The vibration sensing unit is arranged in the spindle housing. It includes three vibration sensors for sensing acceleration of the spindle in three linear axes. It includes a vibration sensor circuit configured to process the sensed signal resulting in a vibration signal by amplification, analog-to-digital conversion and filtering. Thus, the output signal of the vibration sensing unit is a digital signal. Preferably, the vibration sensor circuit is configured to selectively output the vibration sensor signal based on the machining condition and/or the spindle operating condition, in particular by adjusting the cut-off frequency of the filter serving for the filtering.

The crash sensing unit is arranged in the spindle housing. It includes three crash sensors for sensing acceleration of the spindle in three linear axes and a crash sensor circuit configured to process the sensed signal resulting in a crash signal by amplification, analog-to-digital conversion and filtering. The output signal of the crash sensing unit is a digital signal. Preferably, the crash sensor circuit is configured to selectively output the crash sensor signal based on the machining condition and/or the spindle operating condition, in particular by adjusting the cut-off frequency of the filter serving for the filtering.

The tool-position monitoring unit for detecting the position of the clamping interface is configured to generate a tool position signal, wherein the tool position signal is a digital signal.

The motor temperature sensor for detecting the temperature of the motor is arranged closely to the motor and configured to generate a motor temperature signal. In particular, the motor temperature sensor is arranged on the stator or rotor.

The bearing temperature sensor for measuring the temperature of a bearing arranged on the bearing for supporting the spindle shaft is configured to generate a bearing temperature signal. The shaft is supported by several bearings at the different positions. For example, one bearing is arranged in the front part of the spindle to support the front part of the spindle shaft and one bearing is arranged in the rear part of the spindle to support the rear part of the spindle shaft. In order to precisely monitor the temperature of each bearing, it is preferable to arrange on each bearing a temperature sensor to monitor the temperature change of the corresponding bearing.

The spindle diagnosis module is arranged in the spindle housing. It includes a first communication interface configured to communicate with the vibration sensing unit and the crash sensing unit, a second communication interface configured to communicate with the tool-position monitoring unit, a third communication interface configured to communicate with the bearing temperature sensor, a fourth communication interface configured to communicate with an external devices arranged at the outside of the spindle, a processing unit configured to process the received sensor signals and a data storage unit configured to store the received sensor signals.

The first communication interface, the second communication interface and the fourth communication interface are digital communication interface. In particular, first communication interface, the second communication interface and the fourth communication interface are wireless communication.

The vibration sensing unit, the crash sensing unit and the tool-position monitoring unit, the bearing temperature sensor, the motor temperature sensor and the spindle diagnosis module are mounted inside the housing of the spindle. Therefore, the sensing units and the spindle diagnosis module have a short connection for communication and the spindle does not have many external connection lines. This is favorable for high-speed spindle. Thus, the spindle features only one communication interface to the external device. Preferably, the spindle requires only two connections from the external, one for power supply and one for connecting the fourth communication interface, namely Profinet. The makes the mounting of spindle into the machine tool much easier.

In known systems, the output signals of the sensors are normally analog signals. Compared to the analog signals, digital signals as output signals of the sensor have several advantages. Since the digital signals have less noise, and are less prone to distortion and interference, the transmitted digital signals have a better signal quality. Signal-processing of digital signals is more versatile and provides more accuracy. Moreover, the mathematical processing algorithm can be easily implemented for digital signals. This allows more dedicated data analysis. In further, digital signals enable applying the digital communication interfaces, such as I2C, serial peripheral interface (SPI) and IO link.

The crash sensor is based on the acceleration measurement. The acceleration sensors used in the known systems are piezoelectric or piezo-ceramic sensors which are characterized by a high dynamic range over 4 decades and a broad measuring range up to ±1000 g. Piezoelectric sensors are mainly in use for laboratory and test-stand applications. Such sensors normally have large size which makes it impossible to integrate the sensor into the spindle. The high-speed spindle can rotate in a high speed with a high precision. Such spindle requires a very compact design, therefore, there is only limited space inside the spindle. Additionally, this type of sensor has a short lifetime and is insensitive to the temperature variation.

In the present disclosure, the vibration sensors and the crash sensors are micro-electro-mechanical systems (MEMS). These types of vibration sensors and crash sensors can detect accelerations by means of a micromechanical spring-mass-system. They are characterised by a high robustness, a good long-time stability and small size due to micro technology.

Moreover, the application in spindle requires a broad measuring range up to acceleration values of 250 g and frequencies up to 25 kHz. In addition, the signal resolution should be as high as possible. However, the acceleration sensors in the known system have a too large dynamic range for the application in spindle. The crash acceleration in the spindle is in the range of up to 250 g and frequency up to 25 kHz. The vibration acceleration in the spindle is in the range of up to 20 g and frequency up to 10 kHz. When the dynamic range is too large, the resolution of the signal is reduced. In the present disclosure, the vibration sensors and the crash sensors are custom designed. They are configured to be able to provide a sufficient dynamic range and a maximal signal resolution for this application.

Both the vibration sensor and the crash sensor are MEMS sensor for sensing the acceleration of the spindle. However, they are designed to sense the acceleration of the spindle in different signal range with different signal resolution. The crash sensor is designed to sense the acceleration in the range of up to 250 g and frequency up to 25 kHz. The vibration sensor is designed to sense the acceleration occurred in the range of up to 20 g and frequency up to 10 kHz.

The vibration sensor provides an electrical signal which is amplified, converted from the analog signal to the digital signal and filtered by a low-pass filter to define the bandwidth of the vibration signal. The cut-off frequency of the filter is variable and controlled by the spindle diagnosis module.

In a preferred variant, the processing unit of the spindle diagnosis module is configured to high-pass filter the received vibration sensor signal and low-pass filter with a variable cut-off frequency. Preferably, the spindle diagnosis module is configured to select the sensor signals based on the machining condition. In particular, the spindle diagnosis module is configured to select the frequency range of the sensor signals based on the machining condition and/or spindle operating condition. Especially, the selection is performed by adjusting the cut-off frequency of the filter, in particular the cut-off frequency of the low-pass filter.

Applying filters with variable cut-off frequency enables selection of only the signal frequency range which is relevant for the current machining state, machining condition and the spindle operating condition. For example, in milling the frequency of the excitation generated by the cutting process depends on the spindle rotational speed and the number of teeth of the milling tool. Thus, the frequency of the vibration occurred can vary in a broad range. The vibration sensor is configured to be able to sense the vibration occurred at any frequency within the whole frequency range. When the signal frequency range of the output signal of the sensor can be selected, the signal frequency range can be adapted to the dominant frequencies of the excitation generated by the current cutting process. Thus, the data amount can be reduced, and the signal resolution can be improved. Particularly, the vibration sensing unit and the crash sensing unit are configured that the digital output signals have a resolution of 14 bits.

In a variant, the vibration sensing unit is configured to measure the acceleration in the range of 0 to 20 g and the crash sensing unit is configured to measure the acceleration in the range of 0 to 250 g. If the crash signal is larger than a defined threshold value for a defined time interval, a crash event is designated. Crash event data is determined which includes the strength of the crash and the time of the crash occurrence.

Preferably, the vibration sensing unit includes three low-pass filters each of which is configured to filter the signals detected by one vibration sensor for one linear axis. The vibration sensing unit includes a first vibration sensor for detecting the vibration in X-direction and a first low-pass filter for filtering the sensed signal. The vibration sensing unit includes a second vibration sensor for detecting the vibration in Y-direction and a second low-pass filter for filtering the sensed signal. The vibration sensing unit includes a third vibration sensor for detecting the vibration in Z-direction and a third low-pass filter for filtering the sensed signal.

The crash sensing unit includes a first crash sensor for detecting the crash in X-direction and a fourth low-pass filter for filtering the sensed signal. The crash sensing unit includes a second crash sensor for detecting the crash in Y-direction and a fifth low-pass filter for filtering the sensed signal. The crash sensing unit includes a third crash sensor for detecting the crash in Z-direction and a sixth low-pass filter for filtering the sensed signal.

In a variant, the cut-off frequencies of the first filter, the second filter and the third filter can be adjusted and are controlled by a vibration filter control signal, the cut-off frequencies of the fourth filter, the fifth filter and the sixth filter can be adjusted by a crash filter control signal.

For example, the cut-off frequency of the low-pass filters is selectable from one of the following frequencies: 0.5 kHz, 1 kHz, 2 kHz, 2.5 kHz, 3 kHz, 5 kHz, 10 kHz.

Since the cut-off frequency of the filter is adjustable, the proper frequency range of the output signal of the sensing unit can be selected. The output signal of the sensors can be optimally selected for data analysis. On one side, the data transmission is optimized, because not all data in the whole frequency range but only the required data in a specified frequency range is transmitted. On the other hand, the data analysis can be performed more precisely, because more data in the interested frequency range can be transmitted and thus are available for data processing.

Preferably, the vibration filter control signal and the crash filter control signal can be sent by the spindle diagnostic module to the vibration sensor and the crash sensor, respectively. In particular, the vibration filter control signal and the crash filter control signal are generated by the processing unit of the spindle diagnostic module.

By providing the adjustable filter, the large signal frequency can be covered without compromising the signal resolution. Different frequency and acceleration ranges of spindles can be selected. This enables more accurate analysis and a precise crash detection. Moreover, precise analysis of vibration signals enables to monitor and characterize the machining conditions to optimize the machining parameters in order to achieve best possible surface finish, increase the productivity and extend the cutting tool life. It also enables a condition monitoring of the spindle to extend its service life.

In particular, the processing unit of the spindle diagnosis module is configured to perform the axis transformation of the vibration sensor axis and/or the crash sensor axis to the spindle axis. This step allows to assign the sensed values to the corresponding axis of the spindle.

In a preferred variant, the first communication interface is a serial peripheral interface (SPI) directly connected to the crash sensing unit and the vibration sensing unit configured to transfer the vibration signal and the crash signal to the spindle diagnosis module. The SPI is a synchronous bus for high-speed digital devices. For example, the transmission rate is in the range of 4 Mbps to 7 Mbps.

Preferably, the vibration sensing unit, the crash sensing unit are embedded in the same housing defined as vibration-crash sensing unit housing. This device is rigidly fixed in the front part of the spindle, in particular on a flange positioned in the proximity of a front bearing for supporting the front part of the spindle shaft. Mounting the device at this position can ensure that the acceleration on different axes can be optimally sensed by the sensors.

In particular, the sensor housing is fixed on a non-rotation element of the spindle positioned in the front part of the spindle. It is important to fix the sensor housing with the vibration sensing unit and the crash sensing unit therein in a rigid manner in the spindle to obtain a reliable sensing signal. Thus, the sensor housing is preferably glued on a position close to the bearing in the front part of the spindle. Moreover, the sensor housing is positioned in a defined direction such that the vibration sensors and the crash sensors are oriented in a predefined direction by considering the axes directions of the spindle to obtain an optimum sensor signal.

In a variant, the tool-position monitoring sensor measures the tool position based on the inductive measurement. Especially, it measures the position of the clamping interface. The measurement range is 0 to 15 mm.

In some embodiments, the second communication interface is an IO link, in particular an IO master is included in the spindle diagnosis module and the tool-position monitoring unit is an IO slave. The IO link is a communication standard for connecting digital sensors to a communication bus, for example, industrial fieldbus or industrial Ethernet. The IO link incudes an IO master and one or more IO-link devices. The IO link can be wired or wireless. The digital output of the tool-position monitoring sensor makes it possible to communicate the sensor signal with the spindle diagnostic module by the IO link.

In some embodiments, four temperature sensors are provided and each temperature sensor is arranged on one bearing for measuring the temperature of the corresponding bearing. In this manner, the temperatures of all bearings can be monitored and analysed.

In a variant, an axis movement sensor is provided for measuring the movement of the axis.

In a variant, the fourth communication interface is a Profinet. This digital interface opens new possibilities in the area of monitoring and transmitting real time data which allows analysing processes in a more accurate way. The Profinet allows fast and flexible communication.

In particular, the data storage unit of the spindle diagnosis module is configured to store besides the sensor signals, the operating data of the spindle describing the spindle operation conditions, such as operating hours of the spindle, rotation speed of the spindle, and data logger, serial number of the spindle, identification number of the spindle, maximum rotation number of the spindle, the number of the machine tool change. Moreover, the data storage unit is configured to store at least one hundreds crash events.

Moreover, the processing unit of the spindle diagnosis module is configured to analyze the digital vibration signal and the digital crash signal, in particular analyzing the signal in frequency domain. Moreover, the machining data of the machine tool representing the machining condition can be communicated to the spindle and stored in the storage of the spindle diagnosis module. The machining data includes machining parameters such as cutting speed, feedspeed, information related to the machining tools. In particular, the machining data of the machine tool transmitted to the spindle diagnosis module is only stored and processed within the spindle diagnosis module. This data will stay in the spindle diagnosis module and cannot be transmitted further from the spindle diagnosis module to any other device.

In a preferred variant, the processing unit of the spindle diagnosis module is configured to send the vibration signal and/or the crash signal to an external device in a regular time period for diagnosing the bearing quality. Moreover, this data can be utilized for other data analysis, for example a Fast Fourier Transformation.

Preferably, the vibration signal and the crash signal are not stored in the spindle diagnosis module to save the capacity of the storage of the spindle diagnosis module.

In a variant, the external device can send a request signal to the spindle diagnosis module. Upon this request, the spindle diagnosis module starts to transmit the crash signal and the vibration signal to the external device through the Profinet.

Alternatively, the User Datagram Protocol (UDP) is applied. Streaming of real time data via UDP allows a real-time data analysis. Moreover, Transmission Control Protocol (TCP) or Stream Control Transmission Protocol (SCTP) can also be applied. In this manner, the signal processing is not limited by the storage capability of the spindle diagnosis module. Therefore, more sophisticated data analysis is possible, since this can be performed in an external processing unit arranged at the outside of the spindle. In this mode, the sensor signals are only transmitted within a defined period to avoid the overload of the communication.

The present disclosure is directed to a machine tool comprising a machine table for mounting a workpiece thereon and a machine head for mounting the spindle of the present disclosure therein.

In further, the machine tool comprises a control unit which is configured to control the machining. The control unit is configured to communicate with the spindle diagnostic module by a digital communication interface, in particular a Profinet.

In an embodiment, the control unit of the machine tool is configured to receive the vibration signal and the crash signal, and to conduct an anomaly detection for detecting the defects of the spindle. An artificial intelligent algorithm is applied for the anomaly detection. In particular, the principle component analysis is applied.

In a variant, the sensor data received from the sensing units integrated in the spindle and stored in the diagnosis module is communicated to the control unit and displayed on the display of the machine tool, in particular, a large number of crash events can be displayed.

FIG. 1 shows a sectional view of a spindle 1 for a machine tool. The spindle comprises a spindle shaft 6 and a clamping interface 5 mounted at the front end of the spindle shaft. The shaft is driven by a motor including a rotor 3 and a stator 4. The rotor is arranged on the outer surface of the draft and is surrounded by the stator. The first bearing and the second bearing are arranged on the front part of the spindle and the third bearing and the fourth bearing are arranged on the rear part of the spindle. On each bearing a bearing temperature sensor is mounted to measure the temperature of the corresponding bearing. FIG. 1 shows the elements which are relevant for the present disclosure. Thus, not all elements of the spindle are depicted. The arrangements of the sensors and the spindle diagnosis module can be applied also into the spindle having different construction than the spindle shown in FIG. 1.

A vibration sensing unit and a crash sensing unit are integrated in one vibration-crash sensing unit housing 10 and fixedly mounted on a flange of the spindle in a rigid manner. The sensor housing has a cube shape and a small dimension of 21×15×18.3 mm. Since the space inside the spindle is limited, the small size of the sensing unit can ease the integration of the sensor at an optimum position with a defined orientation in accordance with the axes of the spindle. A tool-position monitoring unit 20 is arranged in the rear part of the spindle. A motor temperature sensor 30 for measuring the temperature of the motor is arranged on the stator 4. A first bearing temperature sensor 31 and a second bearing temperature sensor 32 are arranged on the front part of the spindle, in particular on the first front bearing and the second front bearing of the spindle. A third bearing temperature sensor 33 and a fourth bearing temperature sensor 34 are arranged in the back part of the spindle, in particular on the third rear bearing and the fourth rear bearing of the spindle. A spindle diagnostic module 60 is arranged in the back part of the spindle and embedded totally inside of the spindle housing. A power supply connector 62 for supplying the power for the spindle diagnosis module the sensing units and a communication interface connector 61 are mounted at the end of the spindle.

Figure 2:
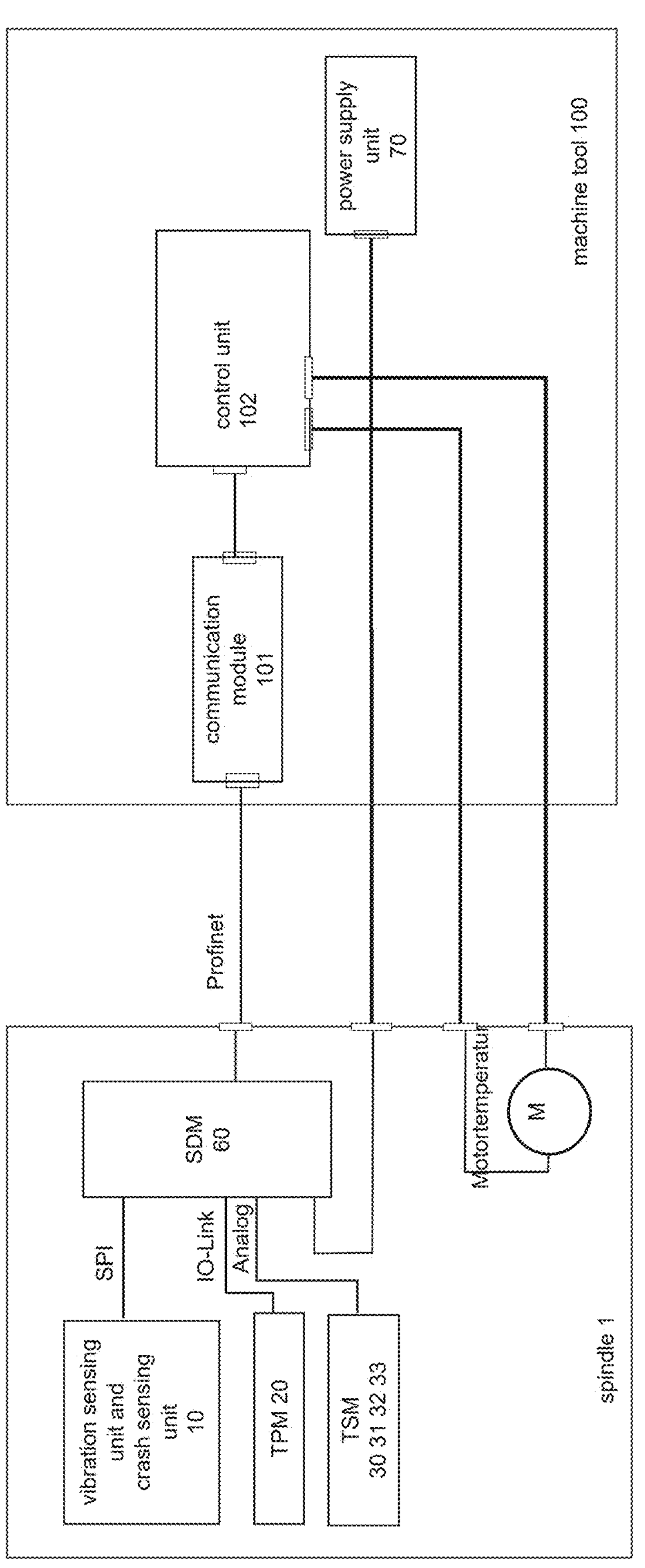
FIG. 2 illustrates a schematic of the communications of sensors and a machine tool.

FIG. 2 shows the communication connections inside the spindle and the communication connections between the spindle and a machine tool 100. FIG. 2 shows one example of how the spindle communicates with the control unit 102 of the machine tool. The vibration sensing unit and the crash sensing unit are configured to communicate with the spindle diagnostic module through a SPI communication interface.

The tool-position monitoring unit (TPM) 20 is configured to communicate with the spindle diagnostic module through an IO link. Additional sensors can be integrated in the spindle as well. The temperature sensor signals of the four bearing temperature sensors for sensing the temperature of bearings are fed directly to the spindle diagnostic module.

The spindle motor is controlled by the control unit 100 of the machine tool. The measured motor temperature can be transmitted to the spindle diagnosis module or directly to the control unit of the machine tool as shown in this figure.

A power supply unit 70 is arranged at the outside of the spindle, for example in the machine tool as shown in the FIG. 2 and supplies the power to the spindle diagnosis module. The spindle diagnostic module can transmit all the data received from the sensing units to the control unit through the Profinet. Moreover, the control unit of the machine tool can also transmit the data through the Profinet to the spindle. FIG. 2 shows a variant in which a communication module 101 is integrated in the machine tool. The Profinet is directly connected to the communication module which again is connected to the control unit of the machine tool.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCES

1 spindle
2 shaft
3 rotor
4 stator
5 clamping interface
6 shaft
10 vibration unit and crash sensor unit
20 tool position monitoring unit
30 motor temperature sensor
31 a first bearing temperature sensor
32 a second bearing temperature sensor
33 a third bearing temperature sensor
34 a fourth bearing temperature sensor
40 encoder speed position sensor
60 spindle diagnostic module
61 communication interface connector
62 power connector
70 power supply unit
100 machine tool
101 communication module
102 control unit

The invention claimed is:

1. A spindle for a machine tool for machining a metal workpiece, comprising:

a. a motor including a stator and a rotor arranged in a spindle housing;

b. a spindle shaft operationally connected to the motor, the rotor being mounted on an outer surface of the spindle shaft, wherein the motor is configured to drive the spindle shaft for rotation;

c. a clamping interface for clamping a machining tool, wherein the clamping interface is arranged at one end of the spindle shaft;

d. a vibration sensing unit for detecting vibration of the spindle arranged in the spindle housing including three vibration sensors for sensing acceleration of the spindle in three linear axes and a vibration sensor circuit configured to process a sensed signal resulting in a vibration signal by amplification, analog-to-digital conversion and filtering;

e. a crash sensing unit configured to detect that a crash event occurred on the spindle arranged in the spindle housing including three crash sensors for sensing the acceleration of the spindle in three linear axes and a crash sensor circuit configured to process a sensed signal resulting in a crash signal by amplification, analog-to-digital conversion and filtering;

f. a tool-position monitoring unit for detecting a position of the clamping interface configured to generate a tool position signal, wherein the tool position signal is a digital signal;

g. a motor temperature sensor for measuring a temperature of the motor arranged closely to the motor on the stator and configured to generate a motor temperature signal;

h. a bearing temperature sensor for measuring a temperature of a bearing arranged on the bearing for supporting the spindle shaft configured to generate a bearing temperature signal; and i. a spindle diagnosis module arranged in the spindle housing including a first communication interface configured to communicate with the vibration sensing unit and the crash sensing unit, a second communication interface configured to communicate with the tool-position monitoring unit, a third communication interface configured to communicate with the bearing temperature sensor, a fourth communication interface configured to communicate with external devices arranged outside of the spindle, a processing unit configured to process received sensor signals, and a data storage unit configured to store the received sensor signals.

2. The spindle according to claim 1, wherein the first communication interface is a serial peripheral interface directly connected to the crash sensing unit and the vibration sensing unit configured to transmit the vibration signal and the crash signal to the spindle diagnosis module.

3. The spindle according to claim 2, wherein the vibration sensing unit and the crash sensing unit are embedded in a same housing defined as a vibration-crash sensing unit housing, which is rigidly fixed in a front part of the spindle on a flange positioned in proximity of a front bearing for supporting the front part of the spindle shaft.

4. The spindle according to claim 1, wherein the vibration sensors and the crash sensors are micro-electro-mechanical-system based sensors.

5. The spindle according to claim 1, wherein the vibration sensor circuit is configured to filter the sensed signal with a variable cut-off frequency that is controlled by the spindle diagnosis module.

6. The spindle according to claim 1, wherein the crash sensor circuit is configured to filter the sensed signal with a variable cut-off frequency that is controlled by the spindle diagnosis module.

7. The spindle according to claim 1, wherein the processing unit of the spindle diagnosis module is configured to perform an axis transformation of a vibration sensor axis and/or a crash sensor axis to a spindle axis.

8. The spindle according to claim 1, wherein the processing unit of the spindle diagnosis module is configured to high-pass filter a vibration sensor signal and low-pass filter with a variable cut-off frequency.

9. The spindle according to claim 1, wherein the processing unit of the spindle diagnosis module is configured to send the vibration signal and/or the crash signal in a regular time period for diagnosing bearing quality.

10. The spindle according to claim 1, wherein the second communication interface is an I/O link, wherein an I/O master is included in the spindle diagnosis module and the tool-position monitoring unit is an I/O slave.

11. The spindle according to claim 10, wherein the tool-position monitoring unit is configured to measure a tool position based on an inductive measurement.

12. The spindle according to claim 1, wherein four bearing temperature sensors are provided and each bearing temperature sensor is arranged on one bearing for measuring the temperature of the corresponding bearing.

13. The spindle according to claim 1, wherein the fourth communication interface is a Profinet.

14. A machine tool including the spindle according to claim 1, wherein the machine tool comprises a control unit configured to control the machine tool and the spindle diagnosis module is configured to communicate with the control unit via the fourth communication interface.

15. The machine tool according to claim 14, wherein the control unit is configured to transmit machining parameters to the spindle diagnosis module by the fourth communication interface.

* * * * *